Oct. 13, 1970    F. A. GUNDERSON    3,533,307
MULTI-RATIO VEHICLE TRANSMISSION
Filed Oct. 17, 1968    6 Sheets-Sheet 1
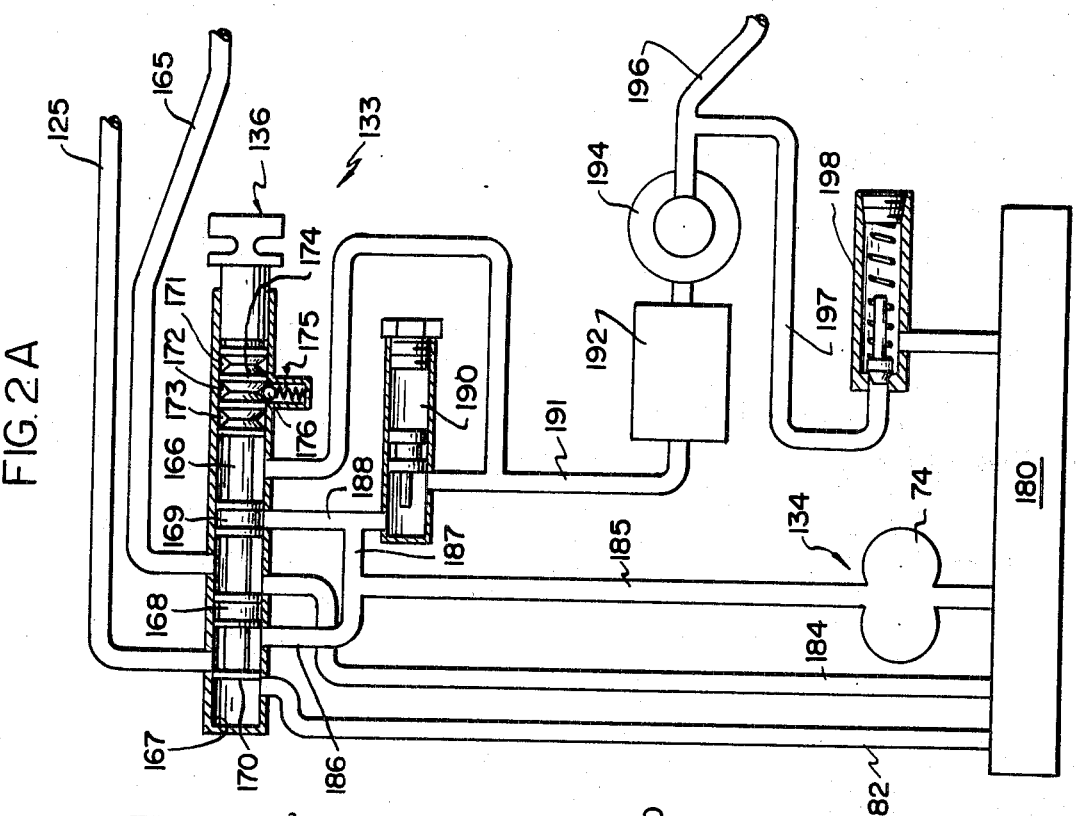
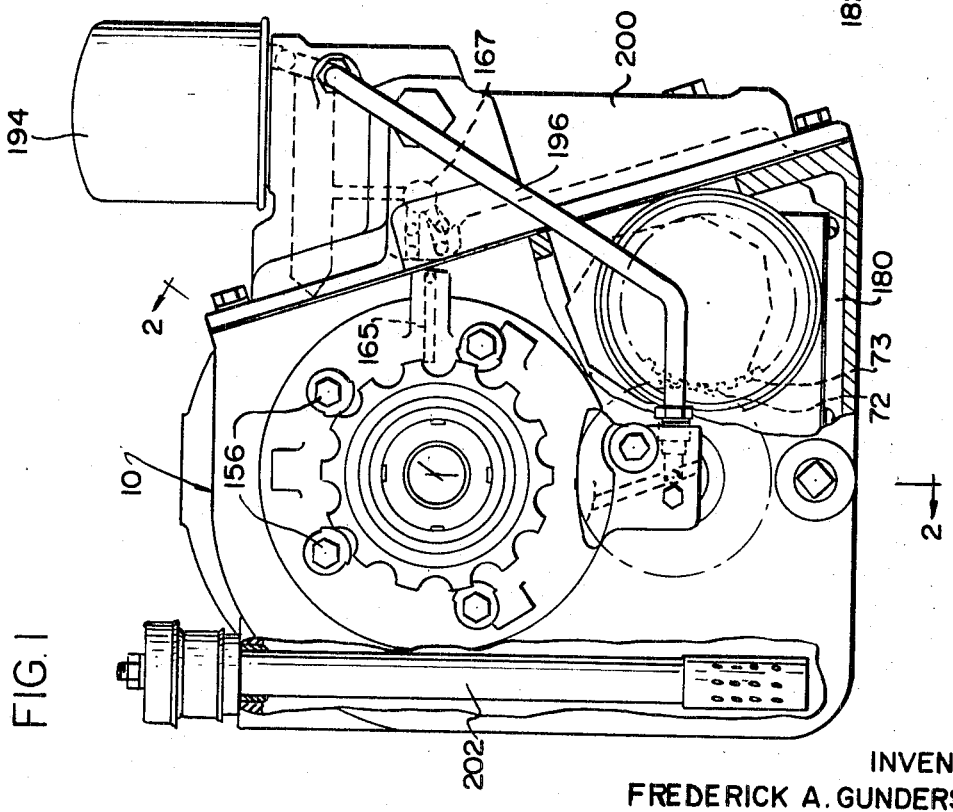
INVENTOR.
FREDERICK A. GUNDERSON
BY Greist, Lockwood, Greenawalt & Dewey
ATTORNEYS.

INVENTOR.
FREDERICK A. GUNDERSON

BY Greist, Lockwood, Greenawalt & Dewey

ATTORNEYS.

INVENTOR
FREDERICK A. GUNDERSON

ATTORNEYS.

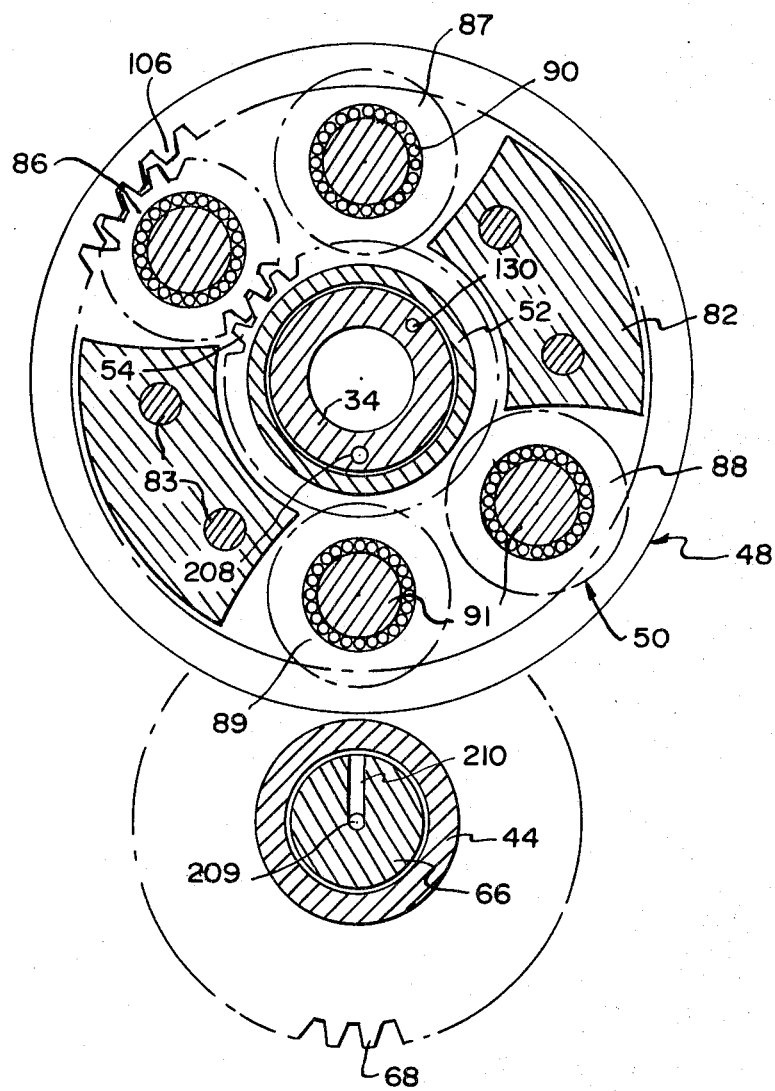
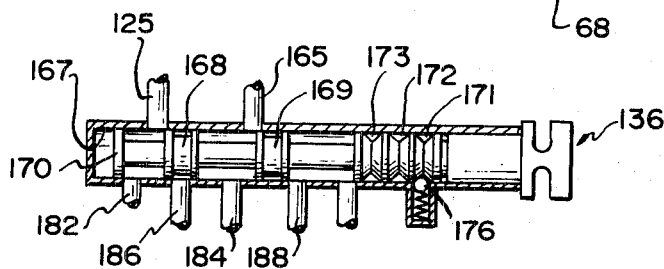
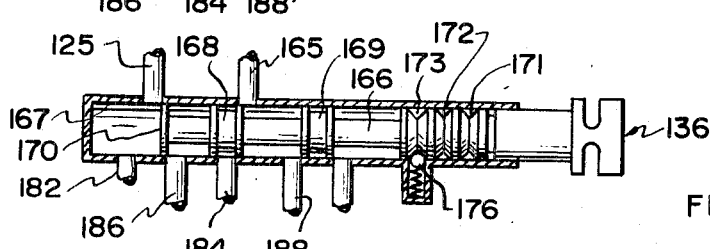

Oct. 13, 1970    F. A. GUNDERSON    3,533,307
MULTI-RATIO VEHICLE TRANSMISSION
Filed Oct. 17, 1968                                6 Sheets-Sheet 6
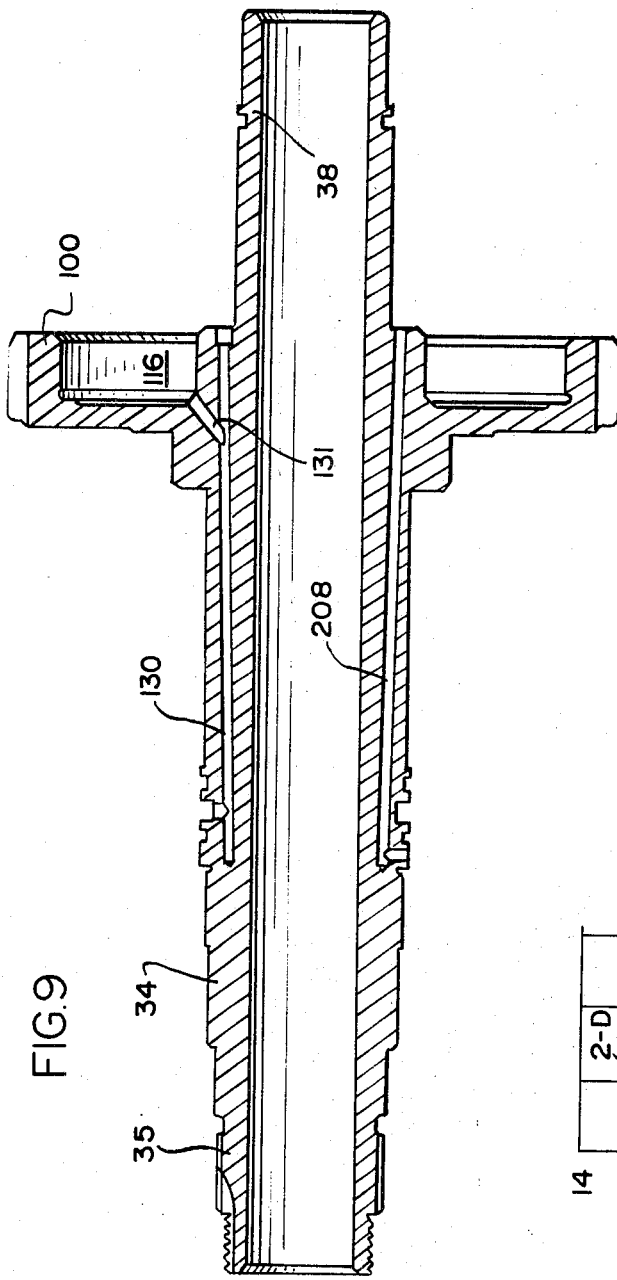
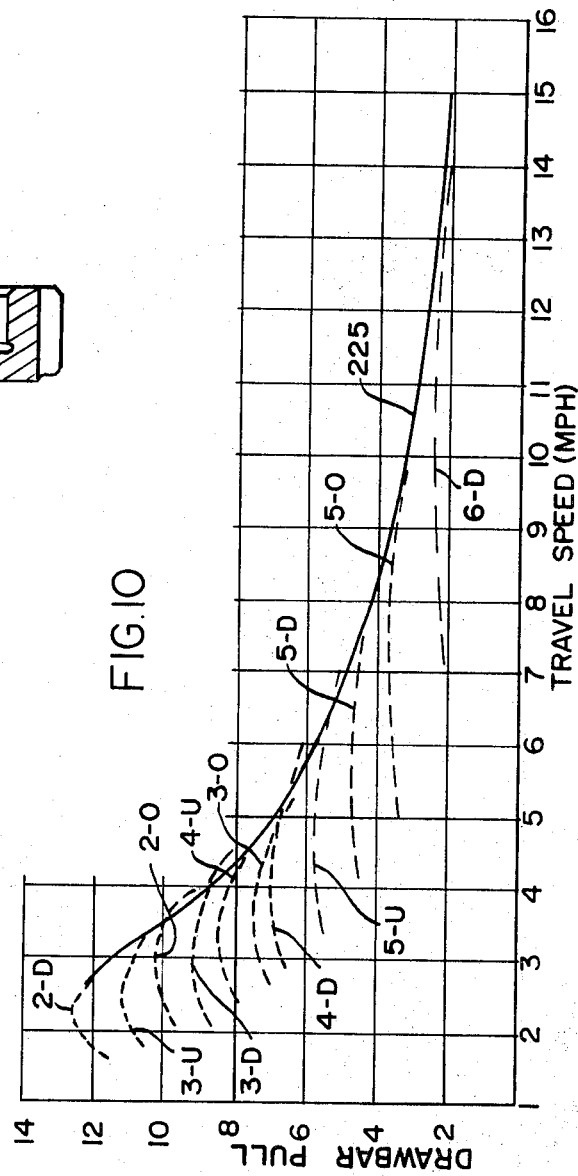
INVENTOR.
FREDERICK A. GUNDERSON
BY Greist, Lockwood, Greenawalt & Dewey
ATTORNEYS.

United States Patent Office 3,533,307
Patented Oct. 13, 1970

3,533,307
MULTI-RATIO VEHICLE TRANSMISSION
Frederick A. Gunderson, San Pedro, Calif., assignor to White Farm Equipment Company, a corporation of Delaware
Filed Oct. 17, 1968, Ser. No. 768,260
Int. Cl. F16h 37/00, 57/10; B60k 17/28
U.S. Cl. 74—740                               18 Claims

ABSTRACT OF THE DISCLOSURE

A multi-ratio vehicle transmission comprising: an input shaft, an output shaft, a counter shaft continuously driven by the input shaft, a first clutch directly coupling the input shaft to the output shaft, planetary gear means, second gear means operatively interconnecting the counter shaft with the planetary gear means, the planetary gear means engaging with a sun gear with a ring gear mounted for rotation on the output shaft, the sun gear being disposed at one end of a sun gear shaft, a stationary element, a friction device at the other end of the sun gear shaft for locking the sun gear shift to the stationary element, and a second clutch operatively interposed between the sun gear shaft and the output shaft. Preferably the first clutch and the friction device are operated by hydraulic fluid means. Also preferably the planetary gear means comprises a drive gear connected to a planet gear carrier and four pinion-type planet gears secured to the planet gear carrier.

In a preferred embodiment of the invention the first clutch is operated to provide a direct drive connection from the input shaft to the output shaft, or the friction device is operated to provide an over drive connection from the input shaft to the output shaft to operate the output shaft at a greater speed than the input shaft. When neither the first clutch nor the friction device are engaged and the speed of the sun gear shaft equals the speed of the output shaft, an under drive connection is provided where the output shaft will be operated at a speed less than the speed of the input shaft.

BACKGROUND OF THE INVENTION

Field of the invention

The field of this invention is a multi-ratio vehicle transmission. The field of the invention is also that of a three speed (three fixed gear ratios) auxiliary transmission for connection between a tractor engine clutch and a standard multiple speed (i.e. multiple fixed gear ratio) transmission of the tractor. The field of this invention is also that of the combination of an auxiliary three speed transmission with a standard six speed transmission. The field of this invention is also that of a three speed auxiliary transmission providing smooth "on-the-go" shifting from one speed to another while maintaining a continuous power train through the transmission whereby power to the load is not interrupted.

Description of the prior art

Heretofore, auxiliary transmissions have been developed for use with a standard multiple speed transmission of a tractor to provide a better means for matching the transmission speeds of the tractor at rated engine r.p.m. to the job at hand and horsepower available at rated r.p.m. With the current emphasis on maximum productivity and efficiency of large tractors it has become increasingly important to have a number of operating speeds available. In the prior art a two speed auxiliary transmission has been developed for use with a standard transmission having anywhere from four (4) to eight (8) gear ratios (i.e. operating speeds at rated engine r.p.m.) whereby up to 16 speeds are provided by using the two speed auxiliary transmission in conjunction with an eight (8) speed standard transmission.

It is not only important to have a number of operating speeds available, but also that these operating speeds compliment the normal tractor operating speed range, namely within the 2–6 m.p.h. range. The prior art auxiliary transmissions have not always provided sufficient 2–6 m.p.h. operating speeds in conjunction with a standard multiple speed transmission.

SUMMARY OF THE INVENTION

It is an object of this invention to provide an auxiliary transmission having three (3) operating speeds, i.e. three (3) fixed gear ratios.

Another object of this invention is to provide a three (3) speed auxiliary transmission for use in conjunction with a six (6) speed standard transmission to provide eighteen (18) total speeds.

Another object of this invention is to provide a three (3) speed auxiliary transmission which when used with a six (6) speed standard transmission provides nine (9) operating speeds in the 2–6 m.p.h. range.

A further object of this invention is to provide a three (3) speed auxiliary transmission which can be operated in one speed without oil pressure so that the operator can "drive home" if the oil pressure is lost and also so that the tractor engine can be started by towing without initial oil pressure.

A further object of this invention is to provide a three (3) speed auxiliary transmission in combination with a six (6) speed transmission thereby providing 18 operating speeds whereby the drawbar pull needed for various tractor operations can be closely matched with the tractor engine speed torque curve to operate the tractor near optimum efficiency, i.e. as near as possible to rated r.p.m.

It is another object of this invention to provide a three (3) speed auxiliary transmission which has smooth "on-the-go" shifting whereby the operator can shift from one speed to another without a loss in (or interruption of) the delivery of power to the tractor wheels or the tractor P.T.O.

It is another object of the invention to provide a three (3) speed auxiliary transmission which is operated by a simple spool valve whereby the operator can quickly and conveniently change from one speed to another by moving the spool valve in or out.

It is still another object of this invention to provide a three (3) speed auxiliary transmission providing a direct drive, an under drive and an over drive wherein the over drive provides approximately a 20 percent increase in speed over direct drive speed and the under drive provides approximately a 17 percent decrease in speed under direct drive speed.

It is still another object of this invention to provide a three (3) speed auxiliary transmission having smooth "on-the-go" shifting wherein the "on-the-go" shifting components are small in number and are contained in one complete assembly thereby providing a simple and compact unit which can be easily installed and overhauled.

It is a still further object of this invention to provide a reliable self-contained three (3) speed auxiliary transmission unit which has a separate oil reservoir and a separate oil pump so that the auxiliary transmission is independent of (not affected by) other drive line components and which auxiliary transmission can be easily removed for servicing of the auxiliary transmission alone.

The invention achieves its objects, and other objects and advantages inherent therein, by providing a multi-ratio vehicle transmission comprising: a power input shaft and a power output shaft rotatable about the same axis, a counter shaft rotatable about an axis parallel to the axis of said input shaft and output shaft, first clutch means for directly coupling said input shaft to said output shaft, first gear means opertaively interconnecting said input shaft with said counter shaft, planetary gear means, second gear means operatively interconnecting said counter shaft with said planetary gear means, a sun gear shaft rotatably supported on said output shaft, a sun gear at one end of said sun gear shaft engaging said planetary gear means, a stationary element, a friction device at the other end of said sun gear shaft for locking the sun gear shaft to the stationary element, ring gear means mounted for coaxial rotation with said output shaft and engaging said planetary gear means, and a second clutch means operatively interposed between said sun gear shaft and said output shaft.

Preferably the first clutch provides for a direct drive connection from the input shaft to the output shaft; the friction device provides for over drive operation of the transmission by locking the sun gear against rotation whereby the planetary gear means will rotate around the sun gear and drive the ring gear mounted on the output shaft to drive the output shaft at a speed greater than the speed of the input shaft; and, when neither the first clutch or, the friction device is engaged, the second clutch means provides for under drive operation of the transmission where the speed of the output shaft is less than the speed of the input shaft, the power drive path for under drive operation being from the input shaft through the first gear means, the counter shaft, the second gear means to the planetary gear means and thence through the planet gears in two paths to the output shaft, the first path being from the planet gears to the sun gear and sun gear shaft and then through the second clutch means to the power output shaft, and the second path being from the planet gears through the ring gear means to the power output shaft.

The invention achieves other of its objects by providing auxiliary power gear means on the counter shaft for driving an oil pump whereby, whenever the counter shaft is rotating, power will be delivered to the pump to develop oil presure.

BRIEF DESCRIPTION OF THE DRAWINGS

FIG. 1 is an end elevational view with portions broken away of a preferred embodiment of the transmission of this invention.

FIG. 2A is a schematic view of a preferred embodiment of the fluid control and lubricating system of this invention.

FIG. 4 is a fragmentary sectional view taken along lines 4—4 of FIG. 2B.

FIG. 5 is a schematic view of the valve means shown in FIG. 2A in its first or under drive position.

FIG. 6 is a schematic view of the valve means shown in FIG. 2A in its third or over drive position.

FIG. 9 is an enlarged sectional view of the power output shaft shown in FIG. 2B.

FIG. 10 is a graph showing a series of curves representing the speed-torque characteristics of a tractor using the three (3) speed auxiliary transmission of this invention.

DESCRIPTION OF THE PREFERRED EMBODIMENT OF TH INVENTION

Figure 2B:
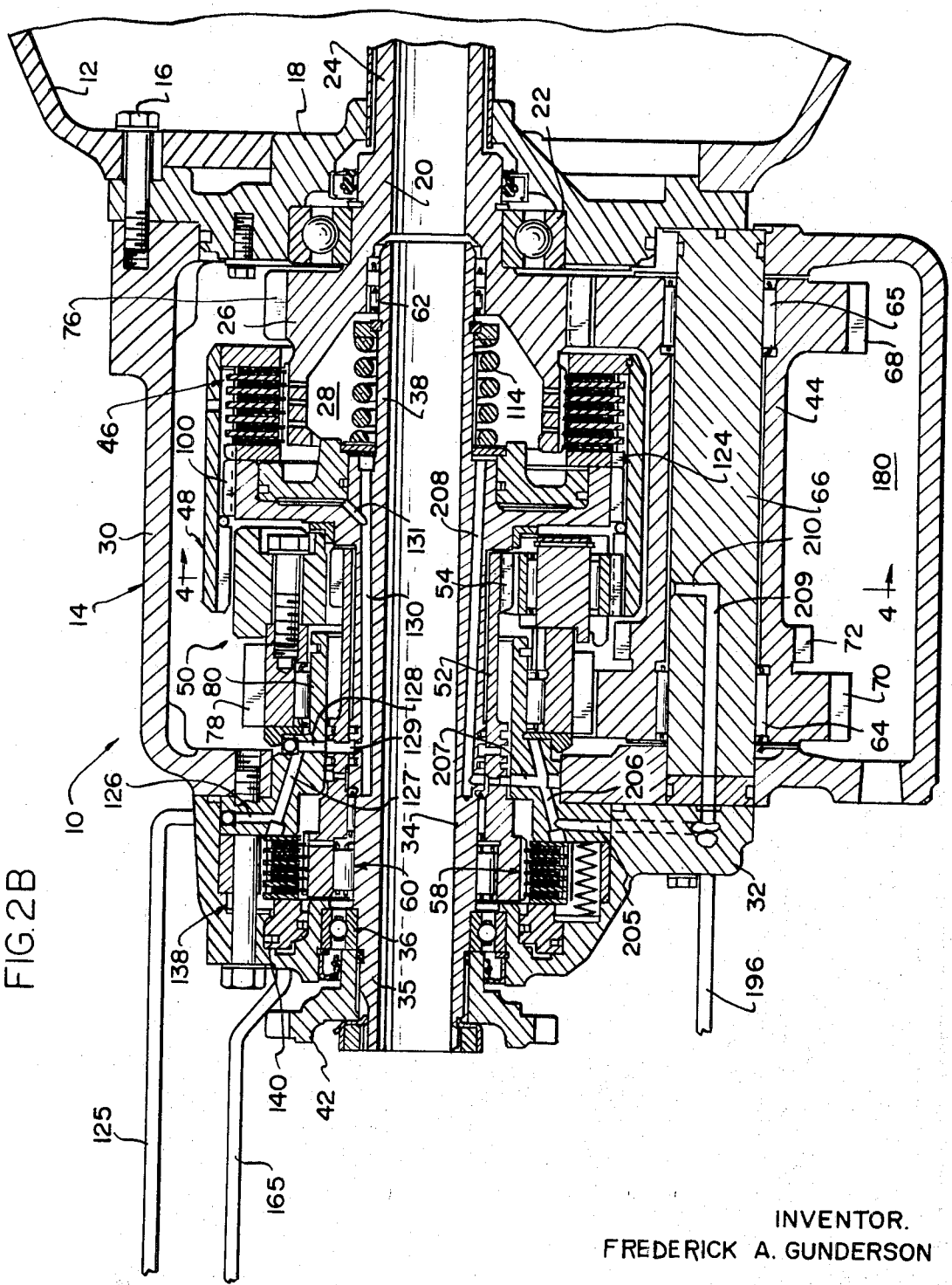
FIG. 2B is a longitudinal sectional view of the internal structure of a prefered embodiment of the transmission of the invention taken along lines 2—2 of FIG. 1 and including a continuation of the schematic view of FIG. 2A.

Referring to FIGS. 1, 2B, 3 and 7 the three (3) speed auxiliary transmission of this invention is generally indicated at 10 and is mounted between a tractor engine clutch (not shown) and a standard multiple speed (multiple fixed gear ratios) transmission (not shown). This auxiliary transmission 10 can be referred to as an over/under hydraulic shift-power shift-transmission. The tractor engine clutch housing is generally indicated at 12. The transmission 10 is supported within a housing generally indicated at 14. Secured to the clutch housing 12 by suitable fastening means 16, such as bolts, is a housing end closure and support plate 18 closing the power input end of the housing 14. A power input shaft 20 is rotatably supported by suitable bearing means 22 on the support plate 18 with one end 24 extending out of the housing 14 for connection to the tractor engine clutch and with the other end 26 extending into the housing 14. The inner end 26 is enlarged and hollow so as to form an axially extending recess 28. The auxiliary transmission housing 14 comprises the support plate 18, a main portion 30 and a housing end closure 32 closing the power output end of said housing 14. A hollow power output shaft 34 is rotatably supported at one end 35 by suitable bearing means 36 within the end closure 32 of the housing 14 with the other end 38 extending into the housing 30. A coupling member 42 is secured to the outwardly projecting end 35 of the shaft 34 and is preferably in the form of a drive sprocket. The drive sprocket coupling 42 is connected in known manner to an identical sprocket on the input shaft (not shown) of a standard transmission (not shown) simply by fitting a short piece of chain (not shown) over the aligned teeth of the two sprockets. The chain permits a small amount of flexibility between the two sprockets. It is to be understood, of course, that other flexible drive connections could be used.

The principal power transmitting parts of the auxiliary transmission in addition to the input shaft 20 and the output shaft 34, are: a counter shaft 44, a first or direct drive clutch 46, a ring gear 48, planetary gear means 50, a hollow sun gear shaft 52 mounting a sun gear 54, a friction device or brake 58 operatively interposed between the sun gear shaft 52 and the end closure 32, and a second or one way over-running clutch 60 operatively interposed between the sun gear shaft 52 and the output shaft 34.

In direct drive operation the power transmitting path is from the input shaft 20 through direct drive clutch 46 to the output shaft 34. In over drive operation the power transmitting path is from the input shaft 20 through counter shaft 44, planetary gear means 50, ring gear 48 to output shaft 34 with the friction device 58 locking the sun gear shaft 52 against rotation. In under drive operation the power transmitting path is from the input shaft 20 through the counter shaft 44 to the planetary gear means 50 and thence in two paths to the output shaft 34, one path being through the ring gear 48 to the output shaft 34 and the other path being through the sun gear 54 and the sun gear shaft 52 and the one way clutch 60 to the output shaft 34, the sun gear shaft 52 driving the output shaft 34 through the one way clutch 60.

The recess 28 opens toward and receives the inner end 38 of the output shaft 34 which is rotatably supported by suitable bearing means 62 within the recess whereby the input shaft 20 and output shaft 34 rotate about the same axis. The counter shaft 44 is hollow and is rotatably supported by suitable bearing means 64 and 65 on a spindle 66, extending between the end closures 18 and 32, for rotation about an axis parallel to the axis of rotation of the input and output shafts 20 and 34.

The counter shaft 44 is provided with a first gear 68 adjacent the end closure 18 operatively and continuously connecting the input shaft 20 in driving relationship with the counter shaft 44, a second gear 70 adjacent the end closure 32 operatively and continuously connecting the counter shaft 44 with the planetary gear means 50 and an auxiliary gear 72, operatively and continuously connecting the counter shaft to a gear drive 73 of an oil pump 74 shown in FIG. 1. The enlarged inner end 26 of the power input shaft 20 is provided with a third gear 76 in continuous meshing engagement with the first gear 68 on the counter shaft 44. Preferably the auxiliary power gear 72 is a spur gear and the first and second gears 68 and 70 are helical gears all formed integrally with the counter shaft 44.

Figure 3:
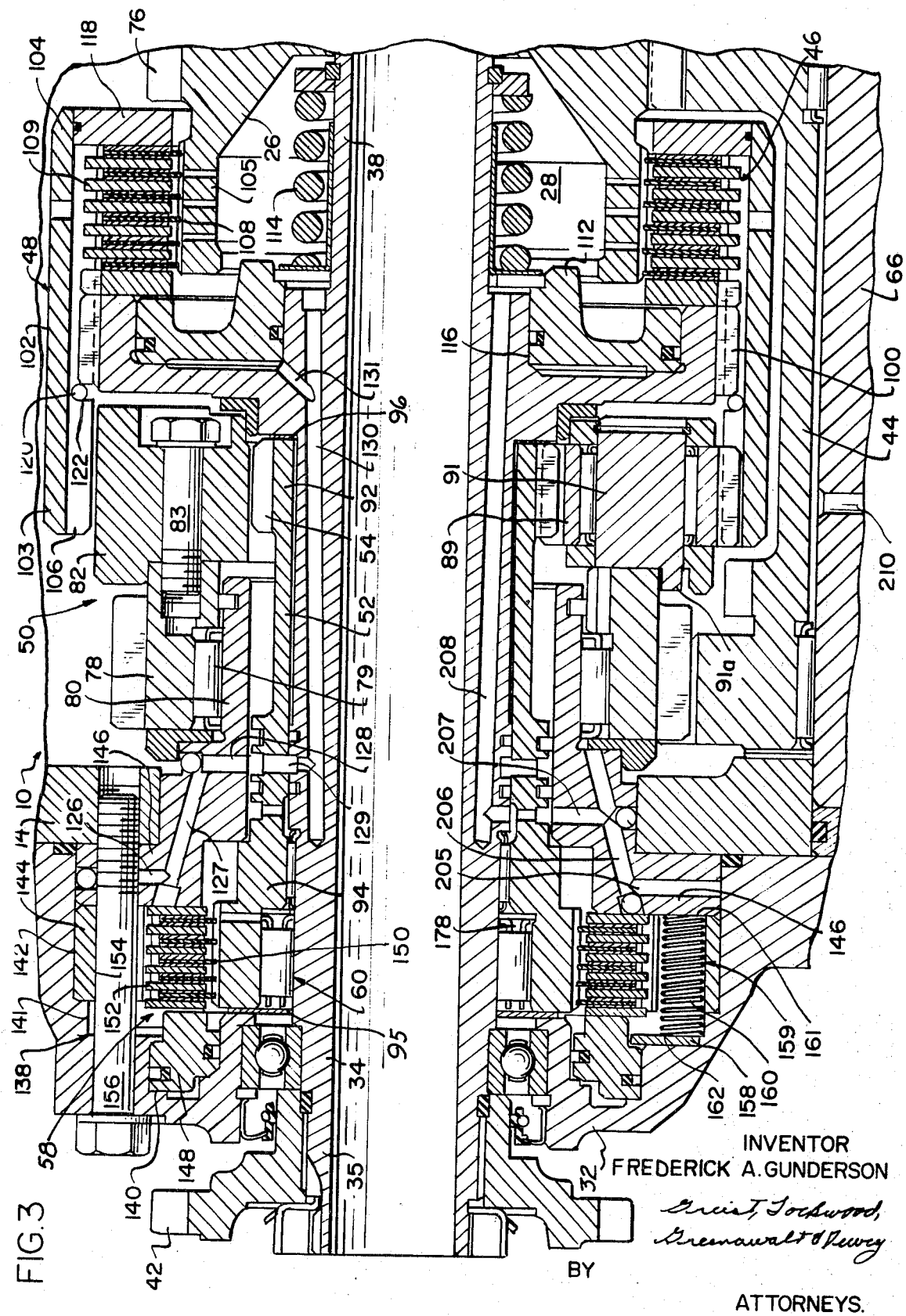
FIG. 3 is an enlarged longitudinal sectional view of a major portion of the internal structure of the transmission shown in FIG. 2B.
Figure 7:
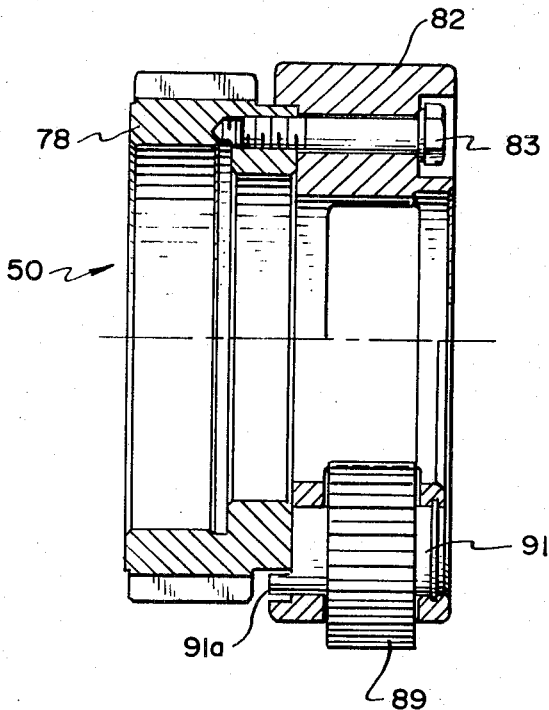
FIG. 7 is an enlarged sectional view of the planetary gear means shown in FIG. 2B.

Referring to FIGS. 3, 4 and 7 planetary gear means 50 comprises a drive gear 78 which is rotatably supported by suitable bearing means 79 (FIG. 3) within the auxiliary transmission housing 14 on a cylindrical support member 80 which extends from the end closure 32 into the interior of the housing 14. Drive gear 78 is in continuous meshing engagement with the second gear 70 on the counter shaft 44. Preferably the third gear 76 and the drive gear 78 are helical gears. A planet gear carrier 82 is secured to the drive gear 78 by suitable fastening means 83 such as bolts. A plurality of pinion-type planet gears, preferably four planet gears 86, 87, 88 and 89 as shown in FIG. 4, are rotatably mounted on the planet gear carrier 82 for rotation about individual axes parallel to the axis of rotation of said power output shaft 34. The four gears are preferably arranged in two pairs with one pair 86, 87 situated diametrically opposite the other pair 88, 89 as shown in FIG. 4. Each pinion gear 86, 87, 88 and 89 is rotatably supported by bearing 90 on a pin 91 carried in the planet gear carrier 82. Preferably each pin 91 has a short projection or tang 91a which engages a pilot surface on drive gear 78 to prevent rotation of the pin 91.

Figure 8:
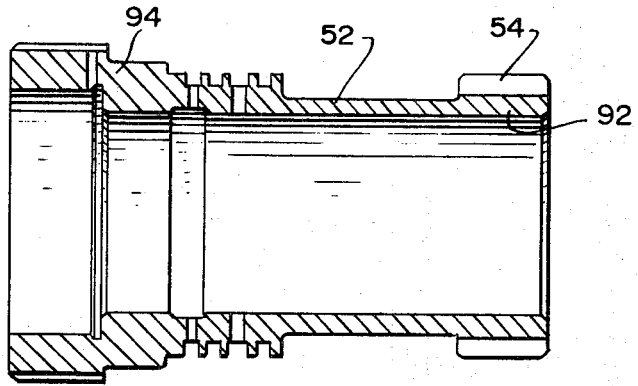
FIG. 8 is an enlarged sectional view of the sun gear shaft shown in FIG. 2B.

Referring to FIGS. 3, 4 and 8 the sun gear shaft 52 is positioned between the cylindrical support member 80 and the power output shaft 34 and is rotatably supported in fixed telescopic relationship on the power output shaft 34. The sun gear 54 is disposed at one end 92 for continuous meshing engagement with the planet gears 86, 87, 88 and 89 of the planetary gear means 50. The friction device 58 is disposed at the other end 94 of the sun gear shaft 54. Preferably thrust washers 95 and 96 are provided on the output shaft 34 adjacent each end 92 and 94 respectively, of the sun gear shaft 52 to maintain proper alignment of the sun gear shaft 52, i.e. the friction device 58 and sun gear 54.

Referring to FIGS. 3 and 9 a spline 100 is formed integral with the power output shaft so as to be situated between the enlarged inner end 26 of the power input shaft 20 and the planet gears 86, 87, 88, 89 mounted on planet gear carrier 82. The ring gear 48 comprises an elongated ring or sleeve member 102 supported on and carried with the spline 100. One end 103 of the ring member 102 encircles the planet gears 86–89 and the other end 104 encircles a portion 105 of the enlarged inner end 26 of the input shaft 20.

Gear teeth 106 are provided on the interior of the ring gear 48 for continuous meshing engagement with the planet gears 86–89. The gear teeth 106 also form part of the spline connection between spline 100 and ring gear 48 so that the ring gear 48 is always operatively connected to the power output shaft 34 through the gear teeth 106 and the spline 100.

The first or direct drive clutch 46 of known type is located between the elongated ring member 102, the spline 100 and the inner end of the input shaft 20 and includes interleafed first and second clutch plates 108 and 109, a ring shaped piston 112 and resilient clutch release means in the form of release spring 114. The first clutch plates 108 are secured to and extend radially outwardly from the portion 105 of the inner end 26 of the input shaft 20 along planes normal to the axis of rotation of the power input shaft 20. A plurality of second clutch plates 109 are secured to and extend inwardly from the interior of the elongated ring member 102 and are interleafed between the first clutch plates 109. The spline 100 has an annular recess 116 therein opening towards the power input shaft 20. The ring shaped piston 112 is received in the annular recess 116. An end flange 118 extends inwardly from the one end 104 of the elongated ring member 102 and is spaced from the ring shaped piston 112 received in the recess 116 whereby the first and second clutch plates are disposed between the end flange 118 and the ring shaped piston 112. As shown in FIG. 3, the end flange 118 is positioned adjacent the third gear 76. To prevent the end flange 118 of the ring gear 48 from engaging the third gear 76, a retainer ring 120 is received in a circular groove 122 formed in the gear teeth 106 and abuts the left hand side of spline 100.

Movement of the ring gear 48 towards the input shaft 20 is thus limited by the engagement of the retainer ring 120 with the spline 100.

Referring to FIGS. 2A, 2B, and 3 a follower member 124 is provided between the ring shaped piston 112 and the clutch plates 108 and 109. A first fluid line 125 including passageways 126, 127, 128, 129, 130, 131 is connected in fluid transmitting relationship between the recess 116 and a hydraulic control system 133. The control system includes a source 134 of fluid under pressure and a selective, three position control valve 136 shown schematically in FIG. 2A. When the control valve 136 is in the position shown in FIG. 2A, the first fluid line 125 is connected to the source 134 of fluid under pressure to operate the first or direct drive clutch 46. Fluid pressure is communicated to the recess 116 via the first fluid line 125 to force the ring shaped piston 112 against the follower member 124. The first and second clutch plates 108 and 109 of the first clutch 46 are then compressed between the ring shaped piston 112 and the end flange 118. The engagement of the first and second clutch plates 108 and 109 provides a direct power drive connection from the input shaft 20 through the ring gear 48 and spline 100 to the output shaft 34.

Referring to FIG. 3 the end closure 32 has a counter-bored stepped recess 138 formed therein facing into the interior of housing 14. The counter-bored recess 138 includes an inner cylindrical recess 140, a first or intermediate stepped portion 141 and a second or outer stepped portion 142. The end 94 of the sun gear shaft 52 is enlarged and is received within the outer stepped portion 142 along with portions of the friction device 58. The friction device 58 includes a ring shaped retainer member 144 which is fitted into the outer stepped portion 142. The outer stepped portion 142 is closed off by an internal wall member 146 integral with cylindrical support member 80. The inner circular recess 140 receives a ring shaped piston member 148 forming another part of the friction device 58. The friction device 58 includes first friction plates 150 carried on and extending radially from the enlarged end 94 of the sun gear shaft 52 along planes normal to the axis of rotation of the sun gear shaft 52 and second friction plates 152 interleafed between the first plates 150. The second plates 152 are secured to and extend radially inwardly from the ring shaped retainer member 144. The ring shaped retainer member 144 has axial holes 154. Bolts 156 are received through holes 154 to secure the end closure 32 to the main portion 30 of the housing 14. The bolts 156 also serve to hold the retainer member 144 against rotation when the friction device 58 is actuated to lock the sun gear shaft 52 against rotation. A ring shaped disc member 158 is disposed in the intermediate stepped portion 141 and engages the ring shaped piston 148 received in the inner circular recess 140. The retainer member 144 also has one or more additional axial holes 159 for receiving resilient release means in the form of a release spring 160 which, at one end 161 engages the internal wall member 146 and at the other end 162 engages the ring shaped disc member 158. The resilient spring means 160 serves to bias the ring shaped piston 148 out of engagement with the plates 150, 152. The inner circular recess 140 is selectively connected in fluid transmitting relationship by second fluid line 165 through the control valve 136 to the source 134 of fluid under pressure as shown in FIGS. 2A and 2B.

Referring to FIGS. 1, 2A, 2B, 5 and 6 the control valve 136 includes a spool valve 166 received in a bore 167. The spool valve 166 includes two spools 168, 169 and a circular end flange 170. Three circular grooves 171, 172, 173 are formed in a cylindrical portion 174 of the spool valve 166 and correspond to three selective operating positions of the control valve 136. Detent means 175 in the form of a spring biased steel ball 176 is associated with the spool valve 166 so as to engage in one of the circular grooves 171, 172, 173, to hold the spool valve 166 in a selected operating position. When the control valve 136 is in its third position with the steel ball 176 engaged in groove 173 the fluid pressure will be communicated from the source 134 via the second fluid line 165 to the inner circular recess 140 to operate the friction device 58. The ring shaped piston 148 is then forced against the first and second clutch plates 150, 152 compressing the same between the internal wall member 146 and the ring shaped piston 148. This engagement of the plates 150, and 152 locks the sun gear shaft 52 to the end closure 32 thereby locking it against rotation. With the sun gear shaft 52 rotating freely, only a small amount of oil pressure is needed to actuate or operate the friction device 58 to lock the sun gear shaft 52 against rotation.

The enlarged end 94 of the hollow sun gear shaft 52 has an enlarged inner diameter which, with the output shaft 34, defines an annular recess 178. The second clutch 60 is situated within the annular recess 178. Preferably the second clutch is a one way over running clutch of known type which will not engage (connect) the sun gear shaft 52 with the power output shaft so long as the power output shaft 34 is rotating at a greater speed than the sun gear shaft 52, if the shafts 34 and 52 are rotating in the same direction. However, when the sun gear shaft 52 tends to rotate at a greater speed than the speed at which the power output shaft 34 may be rotating and in the same direction the one way over running clutch 60 will drivingly engage the power output shaft 34 to rotate same at the speed of the sun gear shaft 52.

In FIGS. 2A, 5 and 6, the component parts of the hydraulic fluid system 133 are shown schematically. In the embodiment described, the hydraulic fluid used is oil of the type which can also be used to lubricate the moving parts of the auxiliary transmission 10. Referring to FIGS. 1 and 2A, a reservoir or sump 180 is located at the bottom of housing 14. A third fluid line 182 is connected in fluid transmitting relationship between the control valve 136 and the reservoir 180 and is adapted for communicating the first fluid line 125 through the control valve 136 to the reservoir 180. A fourth fluid line 184 is connected in fluid transmitting relationship between the control valve 136 and the reservoir 180 and is adapted for communicating the second fluid line 165 through control valve 136 to the reservoir 180. The source 134 of fluid under pressure includes the pump 74 and fluid lines 185, 186, 187 and 188 which connect the pump 74 to the control valve 136 whereby the control valve 136 can selectively communicate fluid pressure to the first or second fluid lines 125 or 165 to actuate the first clutch 46 or the friction device 58, while connecting the other fluid line 165 or 125 with the fourth or third fluid lines 184 or 182 to relieve fluid pressure on the other clutch 58 or 46, or can communicate both fluid lines 125 and 165 with both fluid lines 182 and 184 to relieve pressure on the clutch 46 and the friction device 58. To provide lubricating oil for the auxiliary transmission, the oil pump 74 feeds oil through the fluid lines 185, 187, 188 through a regulator valve 190 to a fluid line 191, through an oil cooler 192 and oil filter 194 to lubrication line 196. An oil bypass line 197 connects lubrication line 196 through an oil pressure bypass valve 198 to the reservoir 180.

Most of the fluid lines as well as the control valve 136 are contained in a cover plate 200 shown in FIG. 1. Some of the passages forming the fluid lines are shown by broken lines in FIG. 1. A conventional oil level dipstick is indicated at 202.

FIGS. 2A, 5 and 6 show the spool valve 166 in the three operating positions. The first operating position is shown in FIG. 5 where the ball 176 is received in groove 171. This is the under drive position where the speed of the output shaft 34 is less than the speed of the input shaft 20. The second operating position is shown in FIG. 2A where ball 176 is received in groove 172. This is the direct drive position where the speed of output shaft 34 is equal to the speed of input shaft 20. The third operating position is shown in FIG. 6 where the ball 176 is received in groove 173. This is the over drive position where the speed of the output shaft 34 is greater than the speed of the input shaft 20.

In direct drive operation the control valve 136 is in the second position with ball 176 in groove 172 as shown in FIG. 2A so that oil pressure is delivered to the circular recess 116 (via lines 185, 186 through bore 167 to first fluid line 125 including passages 126, 127, 128, 129, 130 and 131 to recess 116) to exert pressure on the left hand side of the ring shaped piston 112 in FIG. 2B, to force the piston 112 against the first and second clutch plates 108 and 109 to compress these plates 108 and 109 between the end flange 118 and the follower member 124. In this way the resistance of release spring 114 is overcome to close (engage) the direct drive clutch 46. When the direct drive clutch 46 is closed (engaged), the elongated ring gear 48 is locked to the enlarged inner end 26 of the input shaft 20, so as to be driven thereby. The ring gear 48 by virtue of the engagement between the gear teeth 106 formed on the interior of the ring member 102 with the spline 100 integral with the hollow power output shaft 34, drives the hollow power output shaft 34 at the same speed as the power input shaft 20.

At all times when the auxiliary transmission is in operation, the third gear 76 on the input shaft 20 meshes with the first gear 68 on the counter shaft 44 to drive the auxiliary power gear 72 disposed on the counter shaft 44 between the first and second gears 68 and 70. The auxiliary power gear 72 drives the self-contained oil pressure pump 74 for the auxiliary transmission 10.

To operate the auxiliary transmission 10 in over drive condition, the spool valve 166 is moved to its third position with ball 176 in groove 173. The direct drive clutch 46 will be released since the first fluid line 125 will now be connected to the reservoir in fluid transmitting relationship (i.e., first fluid line 125 comprising passages 126, 127, 128, 129, 130 and 131 is connected through bore 167 and third fluid line 182 to reservoir 180) to relieve the oil pressure from the recess 116. Oil pressure is now applied through the second fluid line 165 to circular recess 140 of the over drive clutch 58 (i.e., from pump 74 through lines 185, 187, 188 and bore 167, and second fluid line 165 to recess 140), to apply pressure against the left hand side of the ring shaped piston 148 whereby the first and second plates 150 and 152 of the friction device 58 are compressed between the ring shaped piston 148 and the interior wall member 146 so as to lock up the sun gear shaft 52 to the end closure 32.

With the sun gear 54 held stationary, the four planet gears 86–89 have to rotate with the planet gear carrier 82 around the stationary sun gear 54. In other words, the now stationary sun gear 54 drives the planet gears and this produces the over drive or step up in speed. The planet gears mesh with the gear teeth 106 to drive the ring gear 48. As previously mentioned, the ring gear 48 is mounted for rotation with the output shaft 34 by means of the engagement of the ring gear means 106 with the spline 100 on output shaft 34. Accordingly, the power output shaft 34 now will be driven by the ring gear 48.

In the under drive operation, the spool valve 166 is moved to the first position with ball 176 in groove 171 so that the first and second fluid lines 125 and 165 are connected through bore 167 to the fluid reservoir 180 via fluid lines 182, 184 thereby relieving the pressure against the pistons 112 and 148 of the first clutch 46 and the friction device 58. With the clutch 46 and the friction device 58 disengaged the second gear 70 on the counter shaft 44 drives the planetary gear means 50; and with the friction device 58 disengaged, the sun gear shaft 52 is free to rotate. Accordingly, the planet gears 86, 87, 88 and 89 as they are rotated in orbit with the drive gear 78, will drive the sun gear 54. When the sun gear shaft 52 attempts to rotate at a speed greater than the speed at which the power output shaft 34 may be rotating, the second clutch 60 will engage and drive the power output shaft 34. As a result, the maximum under drive speed is determined by the ratios of gear 76 to gear 68 and gear 70 to gear 78.

When the auxiliary transmission is first shifted into under drive operation, the planet gears 86–89 will drive only the sun gear 54 and sun gear shaft 52 until such a time as the sun gear 54 and sun gear shaft 52 achieve the speed of the power output shaft 34. Thereupon, the power delivered by the planet gears 86, 87, 88, 89 will be delivered, in part, via the sun gear 52 and sun gear shaft 54 through the second clutch 60 to the output shaft 34 and in part through the ring gear 48 to the spline 100 on the power output shaft 34. In other words, the power drive path for under drive operation is from the input shaft 20 to the first gear 68, the counter shaft 44, the second gear 70, to planetary gear means 50 and thence through the planet gears 86, 87, 88 and 89 in two paths to the output shaft. The first path is from the planet gears 86, 87, 88 and 89 to the sun gear 54 and the sun gear shaft 52 through the second clutch 60 to the power output shaft 34. The second path is from the planet gears 86, 87, 88 and 89 through the ring gear 48 to the power output shaft 34.

It is to be understood that to facilitate shifting of transmission 10, control valve 136 can be connected by mechanical linkage of known type to a control lever located within convenient reach of the operator.

Since the counter shaft 44 is driven at all times when the main engine clutch is engaged and the power input shaft is driven, the oil pump 74 will be driven by the auxiliary power gear 72 and thereby will be delivering oil under pressure at all times the auxiliary transmission is in use. This oil pressure is used in two ways. Part of it is delivered to the main lubricating system through the lubricating line 196 so that the rotating parts of the auxiliary transmission are lubricated at all times in a known manner, and part of it is used to selectively actuate the first or direct drive clutch 46 and friction device 58 upon appropriate actuation of the control valve 136.

Referring to FIG. 1a, the lubricating line 196 includes passages 205, 206, 207, 208, 209 and 210. The oil that is discharged from the lubricated parts collects in the bottom of the housing which forms the reservoir or sump 180 for the lubricating fluid.

It will be noted that in under drive operation, neither the first clutch 46 or the friction 58 is engaged. Hence, in the event there is an oil pressure failure due to a leak in the system, a malfunction of pump 74, or otherwise, and the auxiliary transmission 10 fails to shift or cannot be shifted properly into either over drive or direct drive, the transmission 10 will always automatically "drop" into under drive operation with the result that power transmission is never interrupted.

An important feature of this invention is the ability to start up the tractor engine equipped with the three speed auxiliary transmission by towing the tractor with another vehicle. In order to do this, the main tractor engine clutch is first disengaged, control valve 136 is placed in the over drive position and then the tractor is towed.

The towing will rotaate the hollow output shaft 34 of the auxiliary transmission 10. Rotation of the power output shaft 34 will rotate the ring gear 48 via the spline connection between the gear teeth 106 and the spline 100. The gear teeth 106 are also in continuous meshing engagement with the planet gears 86, 87, 88 and 89 and rotation of the ring gear 48 will cause rotation of the sun gear 54 and sun gear shaft 52. The sun gear shaft 52 and associated parts have a certain amount of internal friction whereby the sun gear shaft 52 tends to resist rotation by the four planet gears 86–89 causing rotation of the planet gear carrier 82. Rotation of the planet gear carrier 82 causes rotation of the counter shaft 46 by virtue of the continuous meshing engagement between the third gear 70 and drive gear 78. The oil pump 74 will then be rotated by the counter shaft 44 by virtue of the continuous meshing engagement between auxiliary power gear 72 and gear drive 73. Control valve 136 is placed in its third or over drive position with ball 176 in groove 173 so that when oil pressure is developed the friction device 58 is actuated. In a very short time the pump 74 will develop sufficient oil pressure for operating the friction device 58 since the friction device 58 requires only a very small volume of oil for operation and spring resistance is relatively low. As soon as the friction device 58 is operated the main engine clutch can be engaged and the towing action can be used to start the tractor engine.

Referring now to the graph shown in FIG. 4, a series of torque-speed curves are shown by broken lines 2–D, 3–U, 2–O, 3–D, 4–U, 3–O, 4–D, 5–U, 5–D, 5–O, and 6–D. These curves represent 11 of the 18 speed-torque curves which are obtained by operating the three speed auxiliary transmission with a standard six speed transmission. The basic vehicle performance curve at fixed transmission ratios and at rated engine r.p.m. (where rated horsepower output is obtained from the tractor) is indicated by line 225. The horizontal axis or abscissa of the curve represent travel speed (miles per hour) of the tractor whereas the vertical axis or ordinate represents the drawbar pull (thousands of pounds) of the tractor. For each one of the three operating conditions, i.e. under drive, direct drive, or over drive, there are three separate curves for each speed of the six speed standard transmission. Each curve has a point of maximum speed operation and a point of maximum torque operation. It will be noted that for each curve, as the speed is reduced, and thereby the engine speed reduced, there is a slight increase in drawbar pull or torque to maximum torque and then a "fall off." Although not shown in FIG. 10, in the "fall off" the engine speed will slow down many times faster than the torque is decreased, with the result that the vehicle stalls readily.

In using a tractor with the transmission 10 the operator will first choose the speed (gear ratio) of the standard transmission which is felt to be most appropriate for the operation or job at hand. The auxiliary transmission 10 is then placed in direct drive. During operation of the tractor the drawbar pull or draft requirements may vary. As these changes in the drawbar pull requirements occur the operator selects the appropriate ratio for the transmission 10, i.e. over drive, direct drive or under drive, by manipulating control valve 136, without interrupting power transfer.

Having selected the appropriate speed or "gear" for the standard transmission for a particular operation, the changes in draft that will ordinarily be encountered will be within the capacity of the auxiliary transmission 10 between over drive and under drive. It will be understood that if a change in draft occurs that falls outside the range provided by the auxiliary transmission, then the standard transmission is shifted to another appropriate speed or "gear."

It is desirable to operate the tractor as close as possible to the point of maximum (i.e., rated), horsepower output on curve 225. In other words, it is desired to operate the tractor at a (combined standard and auxiliary) transmission speed (gear ratio) where the tractor engine is running at rated r.p.m. to develop rated horsepower. the ideal situation is to always operate the standard and auxiliary transmissions on the basic vehicle performance curve 225. For example, it is not efficient to operate the tractor in fourth direct 4–D for a sustained drawbar pull of about 7,000 lbs. at 4 m.p.h. Instead, third direct 3–D would be appropriate since the tractor engine then can be operated near the point of maximum (rated) horsepower. In other words, the load and the maximum operating speed determine in which of the gear ratios (i.e. operating speeds) the transmissions should be operated.

The standard six speed transmission was designed so that the six different operating speeds correspond to different types of loads for various farm implements or to different operations e.g. plowing, cultivating, mowing, propelling a cornheader or other types of tractor operations. For example, plowing may correspond to one or two of the basic speeds while cultivating corresponds to another speed. The three speed auxiliary transmission is so designed that the basic speeds for a standard six speed transmission may be varied 20 percent up and 17 percent down. That is to say, in direct drive operation the speed of the power output shaft will be the same as the power input shaft, in over drive operation the speed of the output shaft will be 20 percent greater than the speed of the input shaft and in under drive operation the speed of the output shaft will be 17 percent below the speed of the input shaft. Thus, in going from direct drive to under drive the engine speed is multiplied by 0.83 and in going from direct drive to over drive the engine speed is multiplied by 1.2. With this arrangement, the under drive speed will be approximately two-thirds the over drive speed.

It is important to have a good selection of speeds between two and six m.p.h. when using the P.T.O. (power take off from the tractor) for driving equipment, since engine speed must remain at a fixed speed (to obtain rated power output) while the travel speed is regulated by gear selection. The three speed auxiliary transmission of this invention is designed to that in combination with a standard six speed transmission nine speeds between two and six m.p.h. are provided.

The transmission of this invention has a minimum of operating parts whereby maintenance and servicing of the transmission will be simple and relatively inexpensive. The basic operating parts involved are: the first, second and third gears, 68, 70, 76 and drive gear 78; the first or direct drive clutch 46; the friction device 58; the second or one way over running clutch 60; the planetary gear means 50 including planet gear carrier 82 and the four planet gears 86–89; the input shaft 20; the output shaft 34; and the counter shaft 44.

An important feature of this transmission is the fact that the component parts thereof are enclosed in a self-contained unit whereby the operation of the transmission is not affected or dependent upon other drive line components. Also with the self-contained unit, it is very simple to remove the unit for servicing without touching the other assemblies of the tractor.

Another important feature of the invention is the fact that this auxiliary transmission offers a three (3) speed range, non-interrupted, "on-the-go" shifting for each of the forward speed ranges of a standard transmission. The positive power transfer in this auxiliary transmission provides smooth speed changes especially under load. This increases operator convenience for power take off operation since travel speed can be matched more closely to the operating requirements. Also this reduces the need for frequent clutch disengagement for speed changes.

Another important feature is that when the engine clutch is not engaged the auxiliary transmission is always in under drive whereby when the engine clutch is engaged there is immediate power transfer through the auxiliary transmission even though initially there is no oil pressure.

A further feature is that both the input and output shafts 20 and 34 can be hollow whereby a second power shaft, such as a P.T.O. shaft, can be operated co-axially within, and independent of, the input and output shafts 20 and 34.

It is to be understood that the difference between the three gear ratios (or speeds) stated above can be varied. For example the under drive gear ratio can be such that the under drive speed is less than 0.83 of the direct drive speed, whereby the "over drive" speed will be less than the direct drive speed.

It will be seen, by reference to the foregoing specification and to the appended claims, that the present invention provides a novel multi-speed vehicle transmission having a number of advantages and characteristics, including those pointed out above and others which are inherent in the invention.

What is claimed is:

1. A multi-ratio vehicle transmission comprising: a power input shaft and a power output shaft rotatable about the same axis, a counter shaft rotatable about an axis parallel to the axis of said input shaft and output shaft, first clutch means for directly coupling said input shaft to said output shaft, first gear means operatively interconnecting said input shaft with said counter shaft, planetary gear means, second gear means operatively interconnecting said counter shaft with said planetary gear means, a sun gear shaft rotatably supported on said output shaft, a sun gear at one end of said sun gear shaft engaging said planetary gear means, a stationary element, a friction device at the other end of said sun gear shaft for locking said sun gear shaft to said stationary element, a ring gear means mounted for coaxial rotation with said output shaft and engaging said planetary gear means, and a second clutch means operatively interposed between said sun gear shaft and said output shaft.

2. A transmission as set forth in claim 1 wherein said second clutch means comprises a one way over-running clutch adapted to drivingly connect said sun gear shaft to said power output shaft.

3. A transmission as set forth in claim 1 comprising means for selectively operating said first clutch means and said friction device including a source of fluid under pressure, first and second fluid pressure lines connected respectively in fluid transmitting relationship to said first clutch means and said friction device, a fluid reservoir, and a selective three-position control valve means, said valve means in its first position interconnecting said first and second fluid lines with said reservoir in fluid transmitting relationship whereby operating pressure is not applied to said first clutch means and said friction device, said valve means in its second position interconnecting source of fluid under pressure with said first fluid line in fluid transmitting relationship to actuate said first clutch means, and said valve means in its third position interconnecting said source of fluid under pressure with said second fluid line in fluid transmitting relationship to actuate said friction device.

4. A transmission as set forth in claim 1 wherein said first clutch means comprises first clutch plates extending from said power input shaft, said ring gear means comprises an elongated ring member surrounding said first clutch plates, second clutch plates extending inwardly from said ring member and being interleafed with said first clutch plates, a spline on said power output shaft, said ring member being supported on said spline for rotation with said output shaft and having an end flange spaced from said spline with said first and second clutch plates being disposed between said spline and said end flange, said spline having an annular recess formed therein opening toward said end flange, a ring shaped piston means disposed in said annular recess and adapted for compressing said clutch plates against said end flange, resilient means on said output shaft biasing said ring shaped piston means into said recess, a fluid pressure line connecting said recess in fluid transmitting relationship to a source of fluid under pressure, and valve means in said fluid pressure line operable to apply fluid pressure to said recess to force said piston means against said clutch plates to compress the first and second clutch plates between the piston means and said end flange, the engagement of said first and second clutch plates providing a power drive connection from said input shaft through said ring member to said spline on said output shaft.

5. A transmission as set forth in claim 1 wherein a housing end closure surrounds said friction device and includes said stationary element, said friction device comprises first plates fixed to and extending from said sun gear shaft, second plates interleafed between said first plates and fixed against rotation to said stationary element, said end closure having an annular recess therein adjacent said plates, an internal wall member formed within said end closure and spaced from said annular recess, said first and second plates being disposed between said annular recess and said internal wall member, a ring shaped piston means received within said recess and having one end adapted for engaging said first and second plates, resilient means biasing said ring shaped piston means out of engagement with said plates, said recess being connected in fluid transmitting relationship through a valve means to a source of fluid under pressure, and operating means are provided for actuating said valve means to supply fluid to said recess to force said ring shaped piston means against said first and second plates to compress same between said ring shaped piston means and said internal wall member to lock said sun gear shaft against rotation.

6. A transmission as set forth in claim 1 wherein said planetary gear means includes a planet gear carrier and a plurality of pinion-type planet gears mounted on said planet gear carrier.

7. A transmission as set forth in claim 1 wherein said first clutch means and said friction device are operated by a hydraulic system comprising a reservoir for hydraulic fluid, pump means for pressurizing said hydraulic fluid, first and second fluid lines for communicating said pressurized hydraulic fluid to said first clutch means and said friction device respectively, and valve means for selectively and alternately connecting said first line and said second line to said pump means and said first and second lines to said reservoir, and wherein auxiliary power gear means is provided on said counter shaft for driving said pump means whereby, whenever the counter shaft is rotating, power will be delivered to said pump means to develop fluid pressure.

8. A transmission as set forth in claim 7 wherein said fluid is oil and said pump means also pumps oil to the moving parts of the auxiliary transmission to provide a lubrication system for the transmission.

9. In a tractor having a multi-speed transmission and a main tractor engine clutch the improvement comprising a three speed transmission connected between said multi-speed transmission and said tractor engine clutch, said three speed transmission in combination with said multi-speed transmission providing an adequate number of gear ratios whereby the drawbar pull needed for various tractor-powered operations at different operating speeds can be closely matched with the tractor engine speed-torque curve to operate the engine near rated r.p.m., said three speed transmission comprising a power input shaft and a power output shaft rotatable about the same axis, a counter shaft rotatable about an axis parallel to the axis of said input shaft and output shaft, first clutch means for directly coupling said input shaft to said output shaft, first gear means operatively interconnecting said input shaft with said counter shaft, planetary gear means, second gear means operatively interconnecting said counter shaft with said planetary gear means, a sun gear shaft rotatably supported on said output shaft, a sun gear at one end of said sun gear shaft engaging said planetary gear means, a stationary element, a friction device at the other end of said sun gear shaft for locking said sun gear shaft to said stationary element, ring gear means mounted for coaxial rotation with said output shaft and engaging said planetary gear means, and second clutch means operatively interposed between said sun gear shaft and said output shaft.

10. A three speed auxiliary transmission for connection between the main engine clutch of a tractor and a standard multiple speed transmission, comprising: a housing having a power input end and a power output end, a power input shaft rotatably mounted on the power input end of the housing with one end thereof extending out from the housing and being adapted for connection to said main engine clutch, a power output shaft rotatably mounted on the power output end of said housing with one end thereof extending out from the housing and having coupling means for connection to the multiple speed transmission, said input and said output shafts being mounted for rotation about the same axis, a counter shaft rotatably supported within said housing parallel to said input and output shafts, first and second gear means mounted respectively adjacent each end of said counter shaft, third gear means on said power input shaft for continuous meshing engagement with said first gear means on said counter shaft, first clutch means operatively interposed between said power input shaft and said power output shaft for directly connecting said power input shaft to said power output shaft, a planet gear carrier rotatably supported within said housing for coaxial rotation about said power output shaft, drive gear means connected to said planet gear carrier adapted for continuous meshing engagement with said second gear means on said counter shaft, a plurality of pinion-type planet gears carried on said planet gear carrier, each planet gear being rotatably mounted for rotation about an individual axis parallel to the axis of said power output shaft, a sun gear shaft rotatably mounted on said power output shaft and having sun gear means at one end thereof for continuous meshing engagement with said planet gears, ring gear means mounted on said power output shaft and engaging said planet gears whereby said planet gears can rotate between said sun gear and said ring gear means, a friction device operatively interposed between a portion of said power output end of said housing and said sun gear shaft for locking said sun gear shaft against rotation so that said planet gears engaging said sun gear can rotate said ring gear means to rotate said power output shaft at a speed greater than said power input shaft, and second clutch means operatively interposed between said sun gear shaft and said power output shaft for drivingly connecting said sun gear shaft to said power output shaft when said sun gear shaft is driven by said planet gears at a speed equal to the speed at which said power output shaft may be rotating whereby power can be transmitted from the power input shaft through said counter shaft to said planet carrier gear and thence through said planet gears in two paths to said power output shaft, the first path being from said planet gears to said sun gear and sun gear shaft through said second clutch means to said power output shaft, the second path being from said planet gears through said ring gear means to said power output shaft, whereby said power output shaft can be driven at a speed less than the speed of said power input shaft and not greater than the speed determined by the ratio of said third gear means to said first gear means and of said drive gear means to said second gear means, and means are provided for selectively operating said first clutch means and said friction device to drive the power output shaft at a speed less than, equal to, or greater than the speed of said power input shaft.

11. A three speed auxiliary transmission as set forth in claim 10 wherein said first clutch means comprises first clutch plates extending from said power input shaft, an elongated ring member surrounding said first clutch plates, second clutch plates extending inwardly from said ring member and being interleafed with said first clutch plates, a spline on said power output shaft, said ring gear means being formed on the interior of said ring member with said ring member being supported on said spline for rotation with said output shaft, said ring member having an end flange spaced from said spline with said first and second clutch plates being disposed between said spline and said end flange, said spline having an annular recess formed therein opening toward said end flange, a ring shaped piston means received in said annular recess and adapted for compressing said clutch plates against said end flange, resilient means on said output shaft biasing said ring shaped piston means into said recess, a fluid pressure line connecting said recess in fluid transmitting relationship to a source of fluid under pressure, and valve means in said fluid pressure line operable to apply fluid pressure to said recess to force said piston means against said clutch plates to compress the first and second plates between the piston means and said end flange, the engagement of said first and second clutch plates providing a power drive connection from said input shaft through said ring member and said spline to said output shaft.

12. A three speed auxiliary transmission as set forth in claim 10 wherein said means for selectively operating said first clutch means and said friction device includes a source of fluid under pressure, first and second fluid pressure lines connected respectively in fluid transmitting relationship to said first clutch means and said friction device, a fluid reservoir, and a selective three position control valve means, said valve means in its first position interconnecting said first and second fluid lines in fluid transmitting relationship with said reservoir, said valve means in its second position interconnecting the source of fluid under pressure in fluid transmitting relationship with said first fluid line to actuate said first clutch means, and said valve means in its third position interconnecting said source of fluid under pressure in fluid transmitting relationship with said second fluid line to actuate said friction device.

13. A three speed auxiliary transmission as set forth in claim 12 wherein said valve means comprises a spool valve.

14. A multi-ratio vehicle transmission comprising: a power input shaft and a power output shaft rotatable about the same axis, and a counter shaft rotatable about an axis parallel to the axis of said input shaft and output shaft; means for operating said transmission in direct drive wherein the output speed in equal to the input speed comprising first clutch means for directly coupling said input shaft to said output shaft; means for operating said transmission in over drive wherein the output speed is greater than the input speed comprising first gear means operatively interconnecting said input shaft with said counter shaft, planetary gear means including a plurality of planet gears, second gear means operatively interconnecting said counter shaft with said planetary gear means, a sun gear shaft rotatably supported in fixed telescopic relationship on said output shaft, a sun gear at one end of said sun gear shaft engaging said planet gears, friction device at the other end of said sun gear shaft for locking said sun gear shaft against rotation for over drive operation, and ring gear means mounted for coaxial rotation with said output shaft and having gear teeth engaging said planet gears; and means for operating said transmission in under drive wherein the output speed is less than the input speed comprising a second clutch means operatively interposed between said sun gear shaft and said output shaft, the power drive path for under drive operation being from said input shaft through said first gear means, said counter shaft, said second gear means to said planetary gear means and thence through said planet gears in two paths to said output shaft, the first path being from said planet gears to said sun gear and sun gear shaft through said second clutch means to said power output shaft and the second path being from said planet gears through said ring gear means to said power output shaft.

15. A transmission as set forth in claim 14 wherein said means for operating said transmission in over drive provides approximately a 20 percent increase in the speed of said output shaft over the speed of said input shaft.

16. A transmission as set forth in claim 14 wherein said means for operating said transmission in under drive provides approximately a 17 percent decrease in the speed of said output shaft below the speed of said input shaft.

17. A transmission as set forth in claim 14 wherein the speed of said output shaft in under drive is approximately two-thirds of the speed of said output shaft in over drive.

18. A transmission as set forth in claim 1 wherein both said input shaft and said output shaft are hollow whereby a second power shaft can be operated coaxially within and independent of said input shaft and said output shaft.

References Cited
UNITED STATES PATENTS

| | | | |
|---|---|---|---|
| 2,592,210 | 4/1952 | Swennes | 74—740 |
| 2,683,997 | 7/1954 | Forster | 74—781 |
| 2,861,482 | 11/1958 | Schjolin | 74—781 |
| 2,923,176 | 2/1960 | Randt | 74—740 |
| 2,985,036 | 5/1961 | Forster | 74—740 |

MARK NEWMAN, Primary Examiner

THOMAS C. PERRY, Assistant Examiner

U.S. Cl. X.R.

74—15.84, 781